(12) United States Patent
Cho et al.

(10) Patent No.: US 11,634,036 B2
(45) Date of Patent: Apr. 25, 2023

(54) VEHICLE HAVING MOTOR AND METHOD OF CONTROLLING THE SAME TO PREVENT COLLISION THEREOF

(71) Applicants: HYUNDAI MOTOR COMPANY, Seoul (KR); KIA MOTORS CORPORATION, Seoul (KR)

(72) Inventors: Jin Kyeom Cho, Suwon-si (KR); Yeon Bok Kim, Seongnam-si (KR); Sung Deok Kim, Seongnam-si (KR); Tae Wook Park, Incheon (KR); Seong Wook Moon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 17/110,844

(22) Filed: Dec. 3, 2020

(65) Prior Publication Data

US 2021/0370780 A1 Dec. 2, 2021

(30) Foreign Application Priority Data

Jun. 2, 2020 (KR) .......................... 10-2020-0066558

(51) Int. Cl.
*B60L 15/20* (2006.01)
*B60T 7/12* (2006.01)
(Continued)

(52) U.S. Cl.
CPC ............ *B60L 15/2009* (2013.01); *B60T 7/12* (2013.01); *B60K 6/48* (2013.01); *B60L 7/10* (2013.01);
(Continued)

(58) Field of Classification Search
CPC ........ B60W 30/09; B60W 2510/1005; B60W 2520/10; B60W 2520/105; B60W 2540/10; B60W 2554/80; B60W 2710/18; B60Y 2200/91; B60Y 2200/92; B60Y 2300/09; B60L 15/2009; B60L 7/10; B60L 2240/12; B60T 7/12
See application file for complete search history.

(56) References Cited

U.S. PATENT DOCUMENTS 5,797,467 A * 8/1998 Watanabe .............. B60K 28/02
403/DIG. 1
6,330,838 B1 * 12/2001 Kalsi ...................... B60K 26/02
74/560

(Continued)

FOREIGN PATENT DOCUMENTS

KR 10-2016-0065539 A 6/2016
KR 10-2018-0078986 A 7/2018

*Primary Examiner* — Mussa A Shaawat
(74) *Attorney, Agent, or Firm* — Morgan, Lewis & Bockius LLP

(57) ABSTRACT

A method of controlling an electrified vehicle to prevent a collision thereof includes: determining whether an accelerator pedal is erroneously operated in the situation in which an obstacle is detected to be present in a traveling path; and when it is determined that the accelerator pedal is erroneously operated, performing braking control such that at least one of hydraulic braking or regenerative braking is selectively performed in a plurality of braking sections determined based on a current vehicle speed and a distance to the obstacle.

19 Claims, 5 Drawing Sheets

(51) Int. Cl.
*B60K 6/48* (2007.10)
*B60L 7/10* (2006.01)
*B60W 30/09* (2012.01)

(52) U.S. Cl.
CPC .......... *B60L 2240/12* (2013.01); *B60W 30/09* (2013.01); *B60W 2510/1005* (2013.01); *B60W 2520/10* (2013.01); *B60W 2520/105* (2013.01); *B60W 2540/10* (2013.01); *B60W 2554/80* (2020.02); *B60W 2710/18* (2013.01); *B60Y 2200/91* (2013.01); *B60Y 2200/92* (2013.01); *B60Y 2300/09* (2013.01); *B60Y 2400/81* (2013.01)

(56) References Cited

U.S. PATENT DOCUMENTS

| | | | | |
|---|---|---|---|---|
| 8,255,121 B2* | 8/2012 | Zagorski | ............... | B60W 50/12 701/45 |
| 9,371,001 B2* | 6/2016 | Fraser | ............... | F02D 41/22 |
| 10,071,721 B2* | 9/2018 | Park | ............... | B60W 10/06 |
| 10,737,687 B2* | 8/2020 | Kim | ............... | B60W 10/06 |
| 10,889,300 B2* | 1/2021 | Cho | ............... | B60W 30/188 |
| 2003/0217880 A1* | 11/2003 | Isogai | ............... | B60W 30/16 180/170 |
| 2009/0171538 A1* | 7/2009 | Kadota | ............... | B60W 10/06 701/51 |
| 2012/0221209 A1* | 8/2012 | Tatsukawa | ............ | B60W 10/184 701/42 |
| 2013/0131945 A1* | 5/2013 | Kimura | ............... | B60K 31/0008 701/70 |
| 2013/0261915 A1* | 10/2013 | Tokimasa | ............... | B60W 10/18 701/70 |
| 2015/0046054 A1* | 2/2015 | Takahashi | ............... | B60T 7/22 701/70 |
| 2015/0274018 A1* | 10/2015 | Crombez | ............... | B60L 7/18 701/22 |
| 2017/0052257 A1* | 2/2017 | Ito | ............... | G01S 17/87 |
| 2017/0058806 A1* | 3/2017 | Soller | ............... | B60W 10/08 |
| 2017/0174211 A1* | 6/2017 | Mizoguchi | ............ | B60W 10/06 |
| 2019/0054921 A1* | 2/2019 | Lee | ............... | B60W 20/10 |
| 2019/0135288 A1* | 5/2019 | Cho | ............... | B60W 20/50 |
| 2019/0344802 A1* | 11/2019 | Yamashita | ............ | B60W 30/146 |
| 2020/0156642 A1* | 5/2020 | Tochigi | ............ | B60W 30/18109 |
| 2021/0155232 A1* | 5/2021 | Ike | ............... | B60W 10/18 |
| 2021/0213967 A1* | 7/2021 | Tochigi | ............... | B60W 50/12 |
| 2021/0221365 A1* | 7/2021 | Mase | ............... | B60W 30/09 |
| 2021/0291822 A1* | 9/2021 | Obi | ............... | B60W 10/04 |
| 2021/0323542 A1* | 10/2021 | Naka | ............... | B60W 50/10 |

* cited by examiner

VEHICLE HAVING MOTOR AND METHOD OF CONTROLLING THE SAME TO PREVENT COLLISION THEREOF

CROSS-REFERENCE TO RELATED APPLICATION

This application claims the benefit of Korean Patent Application No. 10-2020-0066558, filed on Jun. 2, 2020 in the Korean Intellectual Property Office, which is hereby incorporated by reference as if fully set forth herein.

TECHNICAL FIELD

The present disclosure relates to an electrified vehicle and a method of controlling the same so as to prevent a collision thereof attributable to erroneous operation of an accelerator pedal.

BACKGROUND

Vehicle accidents attributable to erroneous operation of an accelerator pedal continue to occur. In order to prevent such accidents, some countries provide incentives, such as tax benefits, to manufacturers of vehicles having functions for preventing erroneous operation by drivers so as to induce the development of erroneous operation prevention functions and vehicles equipped with the same.

A general driver erroneous operation prevention function is implemented so as to suddenly limit the output torque of the engine by automatically recognizing, based on the driver's behavior and voice, the state in which the driver erroneously operates the accelerator pedal without being aware of the erroneous operation, or is implemented so as to detect a pedestrian by fusing information detected through different types of sensors and to warn of the possibility of a collision with the pedestrian by increasing the accuracy with which the distance to the detected pedestrian is measured and the speed relative to the detected pedestrian.

However, if the torque is suddenly limited in order to brake the vehicle to prevent a collision, an accident may still occur due to deterioration of drivability. In addition, it is difficult for the driver to effectively respond to the risk of a collision merely by being provided with a simple warning of the possibility of a collision. In particular, in the case of an electrified vehicle equipped with a motor as a power source, for example, an electric vehicle (EV) or a hybrid electric vehicle (HEV), regenerative braking using the motor is performed. Therefore, there is need for the development of a more effective collision prevention control method that takes regenerative braking into consideration.

The information included in this Background section is only for enhancement of understanding of the general background of the present disclosure and may not be taken as an acknowledgement or any form of suggestion that this information forms the prior art already known to a person skilled in the art.

SUMMARY

The present disclosure is directed to an electrified vehicle and a method of controlling the same to prevent a collision thereof that substantially obviate one or more problems due to limitations and disadvantages of the related art.

An object of the present disclosure is to provide an electrified vehicle and a method of controlling the same so as to more effectively prevent a collision thereof.

In particular, the present disclosure provides an electrified vehicle and a method of controlling the same to prevent a collision thereof in consideration of the characteristics of the brake system in the situation in which the accelerator pedal is erroneously operated.

However, the objects to be accomplished by the embodiments are not limited to the above-mentioned objects, and other objects not mentioned herein will be clearly understood by those skilled in the art to which the embodiments pertain from the following description.

In order to accomplish the above and other objects, a method of controlling an electrified vehicle to prevent a collision thereof according to an embodiment of the present disclosure may include: determining whether an accelerator pedal is erroneously operated in the situation in which an obstacle is detected to be present in a traveling path; and when it is determined that the accelerator pedal is erroneously operated, performing braking control such that at least one of hydraulic braking or regenerative braking is selectively performed in a plurality of different braking sections determined based on the current vehicle speed and the distance to the obstacle.

In addition, a device for controlling an electrified vehicle to prevent a collision thereof according to an embodiment of the present disclosure may include a determination unit configured to determine whether an accelerator pedal is erroneously operated in the situation in which an obstacle is detected to be present in a traveling path and a controller configured to, when the determination unit determines erroneous operation of the accelerator pedal, perform braking control such that at least one of hydraulic braking or regenerative braking is selectively performed in a plurality of different braking sections determined based on the current vehicle speed and the distance to the obstacle.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
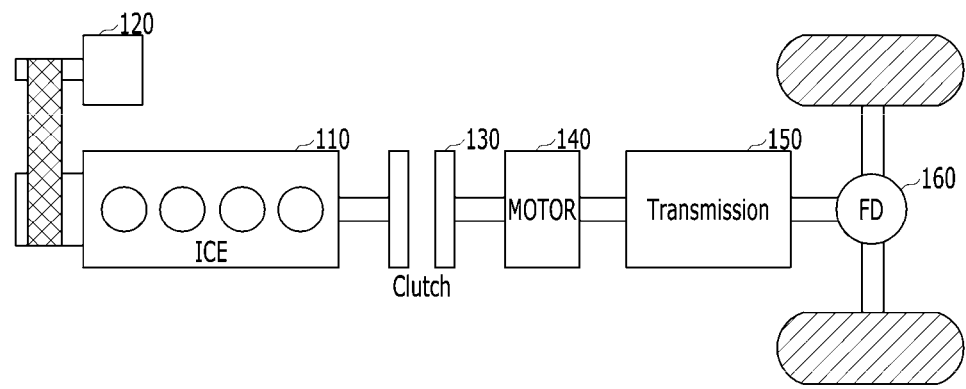
FIG. 1 shows an example of the structure of a powertrain of a parallel-type hybrid electric vehicle to which embodiments of the present disclosure are applicable.

Hereinafter, embodiments of the present disclosure will be described in detail with reference to the accompanying drawings so that those skilled in the art may easily carry out the embodiments. The present disclosure may, however, be embodied in many different forms, and should not be construed as being limited to the embodiments set forth herein. In the drawings, parts irrelevant to the description of the present disclosure will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

Prior to describing an electrified vehicle and a method of controlling the same to prevent a collision thereof according to an embodiment of the present disclosure, the structure and the control system of an electrified vehicle to which embodiments of the present disclosure are applicable will first be described. For convenience of description, the following description will be made on the assumption that the electrified vehicle is a hybrid electric vehicle. It will be apparent to those skilled in the art that components, other than components (e.g. an internal combustion engine) applied only to a hybrid electric vehicle, may be similarly applied to an electric vehicle (EV) or a fuel cell electric vehicle (FCEV).

FIG. 1 shows an example of the structure of a powertrain of a parallel-type hybrid electric vehicle to which embodiments of the present disclosure are applicable.

FIG. 1 illustrates a powertrain of a hybrid electric vehicle employing a parallel-type hybrid system, in which a drive motor 140 and an engine clutch (EC) 130 are mounted between an internal combustion engine (ICE) 110 and a transmission 150.

In such a vehicle, when a driver steps on an accelerator pedal after starting the vehicle, the motor 140 is first driven using the power of a battery in the state in which the engine clutch 130 is open, and then the power of the motor is transmitted to the wheels via the transmission 150 and a final drive (FD) 160 in order to rotate the wheels (i.e. the EV mode). When greater driving force is needed as the vehicle is accelerated, a starter/generator motor 120 may be operated so as to drive the engine 110.

When the rotational speeds of the engine 110 and the motor 140 become equal, the engine clutch 130 is locked, with the result that both the engine 110 and the motor 140, or only the engine 110, drives the vehicle (i.e. transition from the EV mode to the HEV mode). When a predetermined engine OFF condition is satisfied, for example, when the vehicle is decelerated, the engine clutch 130 is open, and the engine 110 is stopped (i.e. transition from the HEV mode to the EV mode). In addition, when the hybrid electric vehicle is braked, the driving force of the wheels is converted into electrical energy, and the battery is charged with the electrical energy, which is referred to as recovery of braking energy or regenerative braking.

The starter/generator motor 120 serves as a starter motor when the engine is started, and operates as a generator when the rotational energy of the engine is collected after the engine is started or when the engine is turned off. Therefore, the starter/generator motor 120 may alternatively be referred to as a "hybrid starter generator (HSG)", or may also be referred to as an "auxiliary motor" in some cases.

The driving mode of the hybrid electric vehicle will be described below in greater detail based on the above-described structure.

The EV mode is mainly used in the situation in which the vehicle speed is low and the requested torque is low. In the EV mode, the engine clutch 130 is open, and only the motor 140 is used as a power source to transmit torque to the wheels.

The HEV mode is mainly used in the situation in which the vehicle speed is high and the requested torque is high. In the HEV mode, both the engine 110 and the motor 140 are used as power sources. The HEV mode may be divided into an HEV series mode and an HEV parallel mode. In the HEV series mode, the engine clutch 130 is open (i.e. the engine 110 and the driving shaft are disconnected from each other), the power of the engine 110 is used to generate power in the HSG 120, and only the motor 140 directly generates driving force. In contrast, in the HEV parallel mode, the engine clutch 130 is locked, and thus both the driving force of the engine 110 and the driving force of the motor 140 are transmitted to the wheels.

Figure 2:
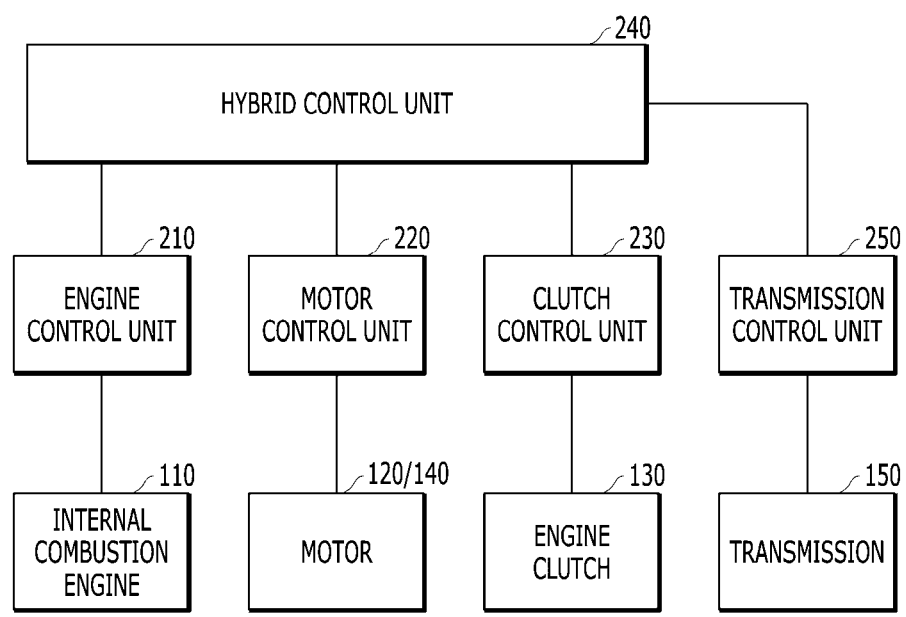
FIG. 2 is a block diagram showing an example of a control system of a hybrid electric vehicle to which embodiments of the present disclosure are applicable.

FIG. 2 is a block diagram showing an example of a control system of a hybrid electric vehicle to which embodiments of the present disclosure are applicable.

Referring to FIG. 2, in a hybrid electric vehicle to which embodiments of the present disclosure are applicable, the internal combustion engine 110 may be controlled by an engine control unit 210, and the torque of the starter/generator motor 120 and the drive motor 140 may be controlled by a motor control unit (MCU) 220. The engine clutch 130 may be controlled by a clutch control unit 230. Here, the engine control unit 210 is referred to as an engine management system (EMS). In addition, the transmission 150 is controlled by a transmission control unit 250.

Each of the control units may be connected to a hybrid control unit (HCU) 240, which is an upper-level control unit that controls the overall process of mode switching, and may provide information necessary for engine clutch control at the time of switching a driving mode or shifting gears and/or information necessary for engine stop control to the hybrid control unit 240, or may perform an operation in response to a control signal under the control of the hybrid control unit 240.

For example, the hybrid control unit 240 determines whether to perform mode switching between the EV mode and the HEV mode depending on the traveling state of the vehicle. To this end, the hybrid control unit determines the time at which to open the engine clutch 130. When the engine clutch 130 is open, the hybrid control unit performs hydraulic pressure control (in the case of a wet engine clutch) or torque capacity control (in the case of a dry engine clutch). Further, the hybrid control unit 240 may determine the state of the engine clutch 130 (lock-up, slip, open, etc.), and may control the time at which to stop injecting fuel into the engine 110. In addition, the hybrid control unit 240 may transmit a torque command for controlling the torque of the starter/generator motor 120 to the motor control unit 220 in order to control stopping of the engine, thereby controlling recovery of the rotational energy of the engine. In addition, the hybrid control unit 240 may determine the mode-switching condition and may control the lower-level control units to perform mode switching at the time of performing driving-mode-switching control.

It will be apparent to those skilled in the art that the connection relationship between the control units and the functions/division of the control units described above are illustrative and are not limited by the names thereof. For example, the hybrid control unit 240 may be implemented such that the function thereof is provided by any one of the control units other than the hybrid control unit 240 or such that the function thereof is distributed and provided by two or more of the other control units.

The above-described configuration in FIGS. 1 and 2 is merely an exemplary configuration of a hybrid electric vehicle. It will be apparent to those skilled in the art that the hybrid electric vehicle to which embodiments of the present disclosure are applicable is not limited to having the above-described configuration.

Hereinafter, collision prevention control according to embodiments of the present disclosure will be described on the basis of the above-described configuration of the hybrid electric vehicle.

An embodiment of the present disclosure proposes technology of braking the vehicle by controlling the brake system in stages when the accelerator pedal is operated in the state in which a certain gear stage is locked so that the vehicle travels in one direction and in which the distance to an obstacle present in the traveling path of the vehicle is less than a predetermined distance.

Figure 3:
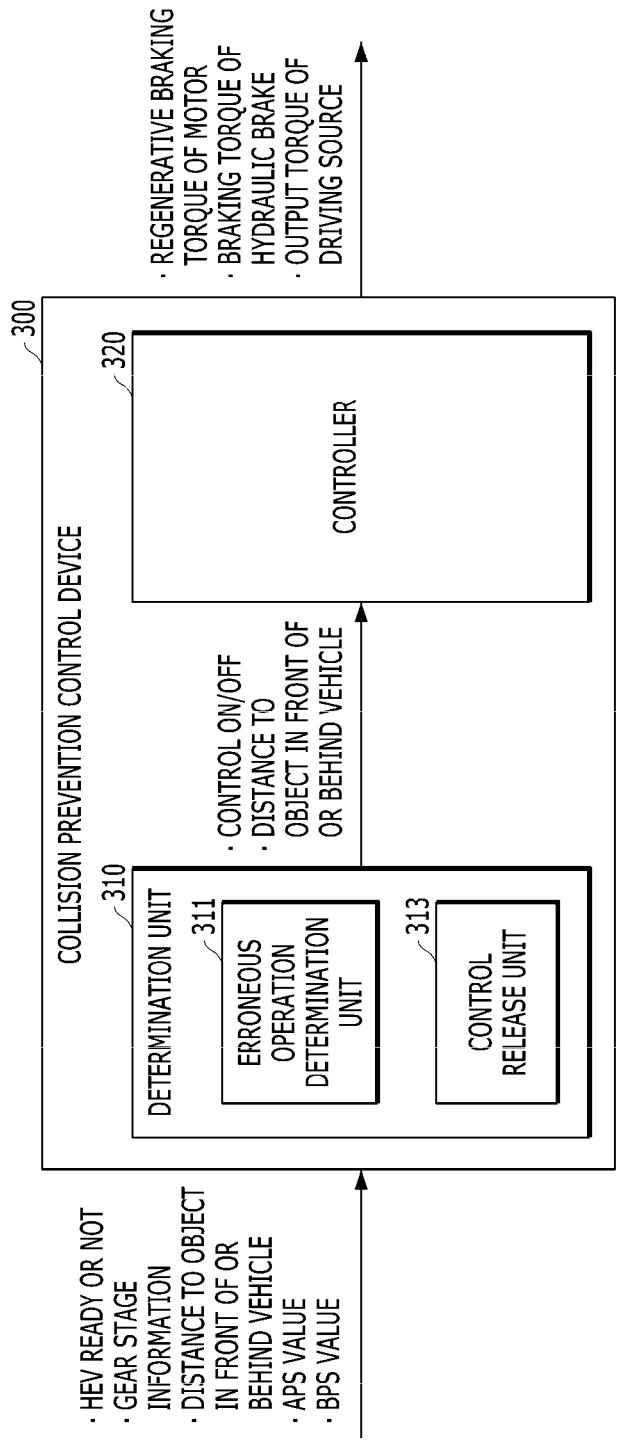
FIG. 3 shows an example of the configuration of a collision prevention control device according to an embodiment of the present disclosure.

FIG. 3 shows an example of the configuration of a collision prevention control device according to an embodiment of the present disclosure.

Referring to FIG. 3, a collision prevention control device 300 according to an embodiment may include a determination unit 310 and a controller 320.

The determination unit 310 may include an erroneous operation determination unit 311, which detects an erroneous operation situation of the accelerator pedal and determines whether to perform collision prevention control, and a control release unit 313, which determines whether the erroneous operation situation of the accelerator pedal has been terminated and releases the collision prevention control.

The controller 320 may receive an instruction to perform or release collision prevention control from the determination unit 310, and may also obtain information on the distance to an object present in the traveling path of the vehicle. When receiving an instruction to perform collision prevention control from the determination unit 310, the controller 320 may reduce the output torque of the power source according to the current driving mode (e.g. set the output torque to 0), and may selectively perform regenerative braking and hydraulic braking in multiple braking stages. In addition, the controller 320 may output warning information indicating the erroneous operation situation of the accelerator pedal through a predetermined output device (e.g. a display of a cluster or a speaker) in a control entry situation.

Hereinafter, the operation of the components of the collision prevention control device 300 will be described in more detail.

The determination unit 310 may receive information on whether the hybrid electric vehicle is ready for travel (i.e. HEV Ready, which corresponds to "IG on" of a general vehicle), information on the currently selected gear stage, information on the distance to an object present in the traveling path of the vehicle (i.e. in front of or behind the vehicle), information on the value of an accelerator pedal position sensor (APS), and information on the value of a brake pedal position sensor (BPS). The information on the currently selected gear stage may be obtained from the transmission control unit 250, and the distance information may be obtained through a sensor capable of detecting a distance, such as a vision sensor, a radar, or a lidar, or through a control unit controlling the distance detection sensor, e.g. an advanced driver assistance system (ADAS) control unit. The APS value or the BPS value may be directly obtained from the corresponding sensor, or may be obtained through another control unit controlling the powertrain, such as the engine control unit 210, without being limited thereto.

The erroneous operation determination unit 311 may determine to begin collision prevention control according to an embodiment when the driver operates the accelerator pedal beyond a threshold operation amount $Accel_{thr}$ in the situation in which the current state of the vehicle is "HEV Ready", in which a certain gear stage (i.e. the D range or the R range) is locked so that the vehicle travels in one direction, and in which the distance to an object present in the traveling path of the vehicle is less than a threshold distance $D_{thr}$.

Here, the threshold distance $D_{thr}$ may be a distance that the vehicle is to travel during a threshold time period $T_{collision}$ when the accelerator pedal is operated by the threshold operation amount $Accel_{thr}$ at the current speed. For example, the threshold operation amount may be set to 20%, and the threshold time period may be set to 1 second, without being limited thereto. It will be apparent to those skilled in the art that the threshold operation amount and the threshold time period may be variably set depending on the specifications of the vehicle and the travel environment of the vehicle. In addition, in some embodiments, the threshold distance $D_{thr}$ in the D-range state and the threshold distance $D_{thr}$ in the R-range state may be set differently from each other.

The concrete method of obtaining the threshold distance will be described below with reference to FIG. 4.

Figure 4:
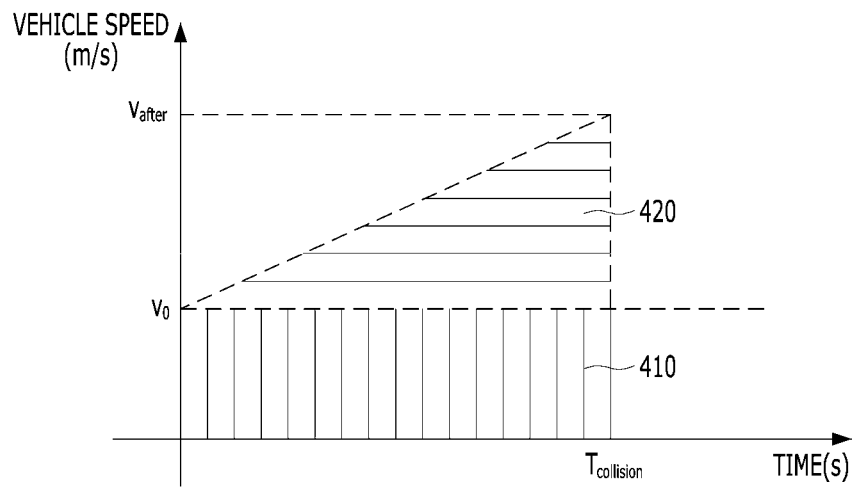
FIG. 4 shows an example of a method of calculating a threshold distance according to an embodiment of the present disclosure.

FIG. 4 is a graph showing an example of a method of calculating the threshold distance according to an embodiment of the present disclosure. In the graph shown in FIG. 4, the horizontal axis represents time and the vertical axis represents a vehicle speed, and thus the area under the line represents a distance.

Referring to FIG. 4, the threshold distance is the sum of the distance 410 that the vehicle is to travel during the threshold time period $T_{collision}$ at the current speed $v_0$ and the distance 420 that the vehicle is to further travel during the threshold time period $T_{collision}$ at a speed difference ($v_{after} - v_0$) by which the vehicle speed increases due to operation of the accelerator pedal.

In conclusion, the threshold distance $D_{thr}$ may be calculated as follows: $D_{thr} = v_0 \times T_{collision} + \frac{1}{2} \times (v_{after} - v_0) \times T_{collision}$. When the threshold time period $T_{collision}$ elapses, the vehicle speed $V_{after}$ may be calculated as follows: $V_{after} = v_0 + a \times T_{collision}$. Here, the acceleration a may be obtained using Equation 1 below.

$$a = \frac{Tq_{whl\_out} * R - F_{Disturbance}}{m} \quad \text{[Equation 1]}$$

In Equation 1, $Tq_{whl\_out}$ represents the torque that is applied to the wheel when the accelerator pedal is operated by the threshold operation amount $Accel_{thr}$, represents the radius of the wheel, and m represents the mass of the vehicle. $F_{Disturbance}$ represents the external force that is applied to the vehicle due to traveling resistance and a slope.

The torque $Tq_{whl\_out}$ may be calculated in advance for a specific vehicle according to the threshold operation amount $Accel_{thr}$, or a value measured through experimentation may be used as the torque $Tq_{whl\_out}$. However, the embodiments are not limited thereto.

The external force $F_{Disturbance}$ applied to the vehicle due to traveling resistance and a slope is a value that can be easily obtained by a person skilled in the vehicle field in consideration of the type of the vehicle (air resistance) and the travel situation (e.g. the vehicle speed). Thus, a description of a concrete method of calculating the same will be omitted.

The control release unit 313 may instruct the controller 320 to release the collision prevention control when a preset release condition is satisfied in the situation in which the collision prevention control is activated by the determination of the erroneous operation determination unit 311. For example, the release condition may be satisfied when the driver performs an operation indicating his/her willingness to release the collision prevention control, for example, steps on the brake pedal or shifts to the neutral range (N range) or the parking range (P range) or when the vehicle is stopped. However, the embodiments of the present disclosure are not limited thereto.

Upon receiving a control entry signal from the erroneous operation determination unit 310, the controller 320 may activate collision prevention control. In the collision prevention control, the controller 320 may first reduce the output torque of the power source (e.g. set the output torque to 0), specifically the output torque of the power source that currently generates driving force, among the engine 110 and the motor 140, according to the driving mode.

In addition, the controller 320 may perform braking control such that at least one of regenerative braking or hydraulic braking is selectively performed in multiple braking stages in order to stop the vehicle.

According to an embodiment, the braking control may be divided into three stages over time. This will be described with reference to FIG. 5.

Figure 5:
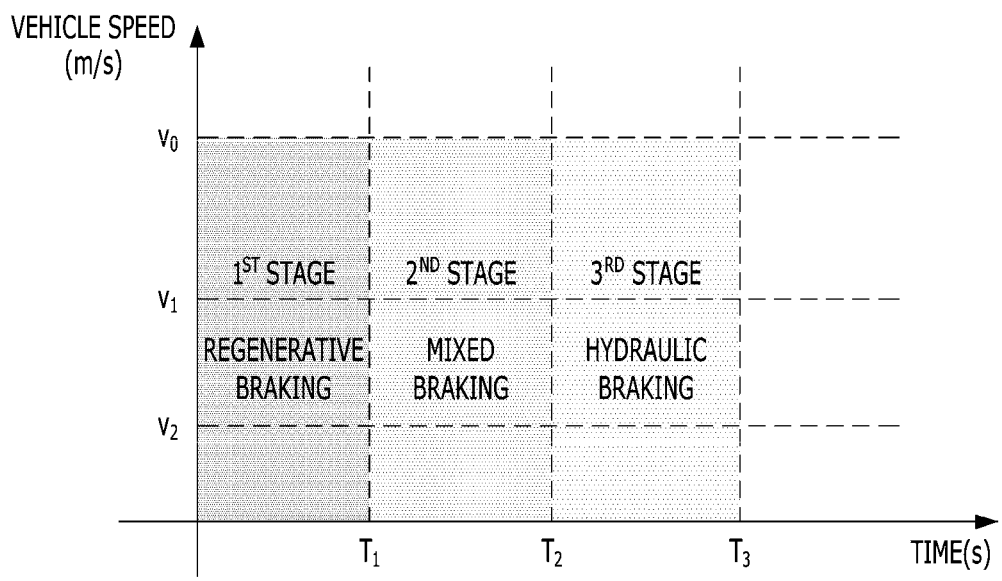
FIG. 5 shows an example of division of braking stages according to an embodiment of the present disclosure.

FIG. 5 shows an example of division of braking stages according to an embodiment of the present disclosure.

Referring to FIG. 5, the braking stage may be divided into a first stage from a control starting point to T1, a second stage from T1 to T2, and a third stage from T2 to T3. In addition, regenerative braking may be performed in the first stage, mixed braking, in which regenerative braking and hydraulic braking are combined, may be performed in the second stage, and hydraulic braking may be performed in the third stage. In addition, the time interval defining each braking stage may be determined by dividing T3 into 3 equal sections, without being limited thereto. The time interval may be determined in various other division manners. Here, T3 may be the time taken for the vehicle to reach an obstacle present in the traveling path of the vehicle when the current vehicle speed $v_0$ is maintained.

Hereinafter, braking control in each stage will be described in detail with reference to FIGS. 6A and 6B.

Figure 6A:
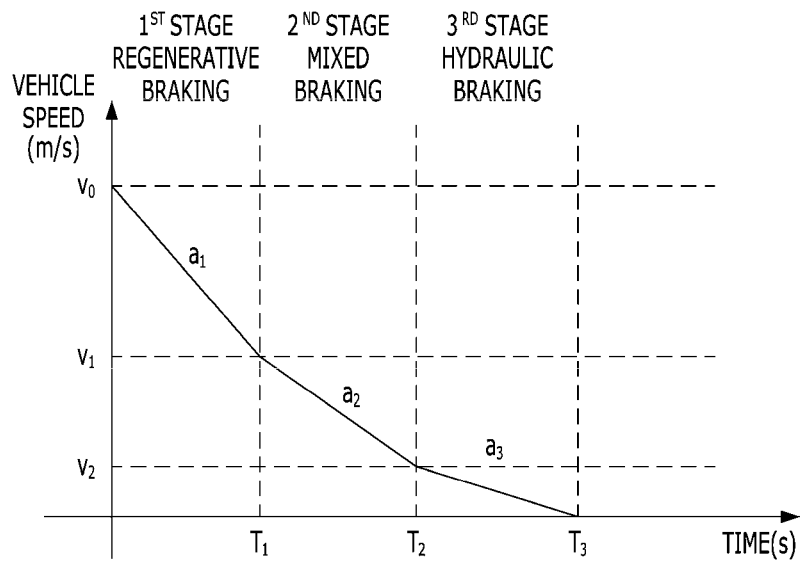
FIGS. 6A and 6B show an example of acceleration and braking torque in each braking stage during collision prevention control according to an embodiment of the present disclosure.
Figure 6B:
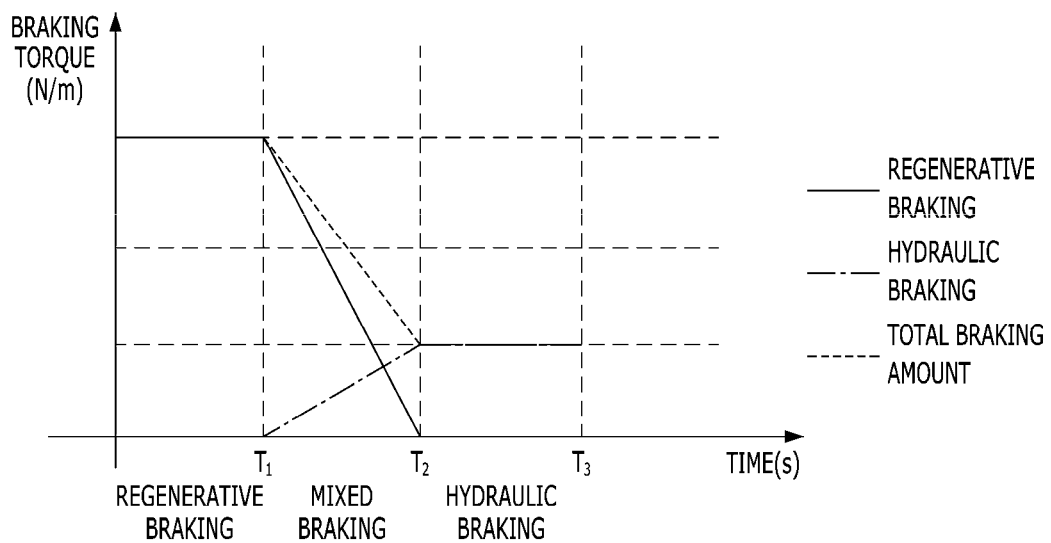

FIGS. 6A and 6B show an example of acceleration and braking torque in each braking stage during collision prevention control according to an embodiment of the present disclosure.

In FIGS. 6A and 6B, the upper graph represents a change in the vehicle speed over time, and the lower graph represents the braking torque of each brake source over time. Therefore, the slope of the upper graph may represent acceleration (deceleration).

First, the controller 320 may perform control such that deceleration $a_1$ is generated in the first stage (regenerative braking). Here, $a_1$ is the deceleration at which the vehicle speed decreases from the current speed $v_0$ to $v_1$ during T1. The reasons for applying only regenerative braking in the first stage are that regenerative braking using the motor 140 is more responsive than hydraulic braking using the hydraulic brake system and that a high-voltage battery (not shown) that supplies power to the motor 140 can be charged.

In addition, the controller 320 may perform control such that deceleration $a_2$ is generated through mixed braking in the second stage. Here, $a_2$ is the deceleration at which the vehicle speed decreases from $v_1$ to $v_2$ during T2–T1. At this time, the controller 320 may perform control such that the regenerative braking torque gradually decreases and the hydraulic braking torque gradually increases as time passes from T1 to T2. The reason for this is to secure smooth transition from regenerative braking to hydraulic braking, because hydraulic braking is required for complete stopping in the final stage.

In addition, the controller 320 may perform control such that deceleration $a_3$ is generated through hydraulic braking in the third stage. Here, $a_3$ is the deceleration at which the vehicle speed decreases from $v_2$ to 0 during T3–T2.

The absolute magnitudes of the decelerations $a_1$, $a_2$ and $a_3$ may have the relationship $|a_1|>|a_2|>|a_3|$ therebetween. For example, $v_1$ may be set to have a value of 7.2 kph, and $v_2$ may be set to have a value of 3.6 kph, without being limited thereto. It will be apparent to those skilled in the art that $v_1$ and $v_2$ may be variably set depending on the specifications of the vehicle and the travel environment of the vehicle.

In the embodiment, the collision prevention control device 300 may be implemented as a constituent element or a function of the hybrid control unit 240, or may be implemented in the form of an integrated brake actuation unit (iBAU). Alternatively, the collision prevention control device 300 may be implemented as a separate control unit.

The above-described control process of the collision prevention control device 300 will be described below with reference to the flowchart shown in FIG. 7.

Figure 7:
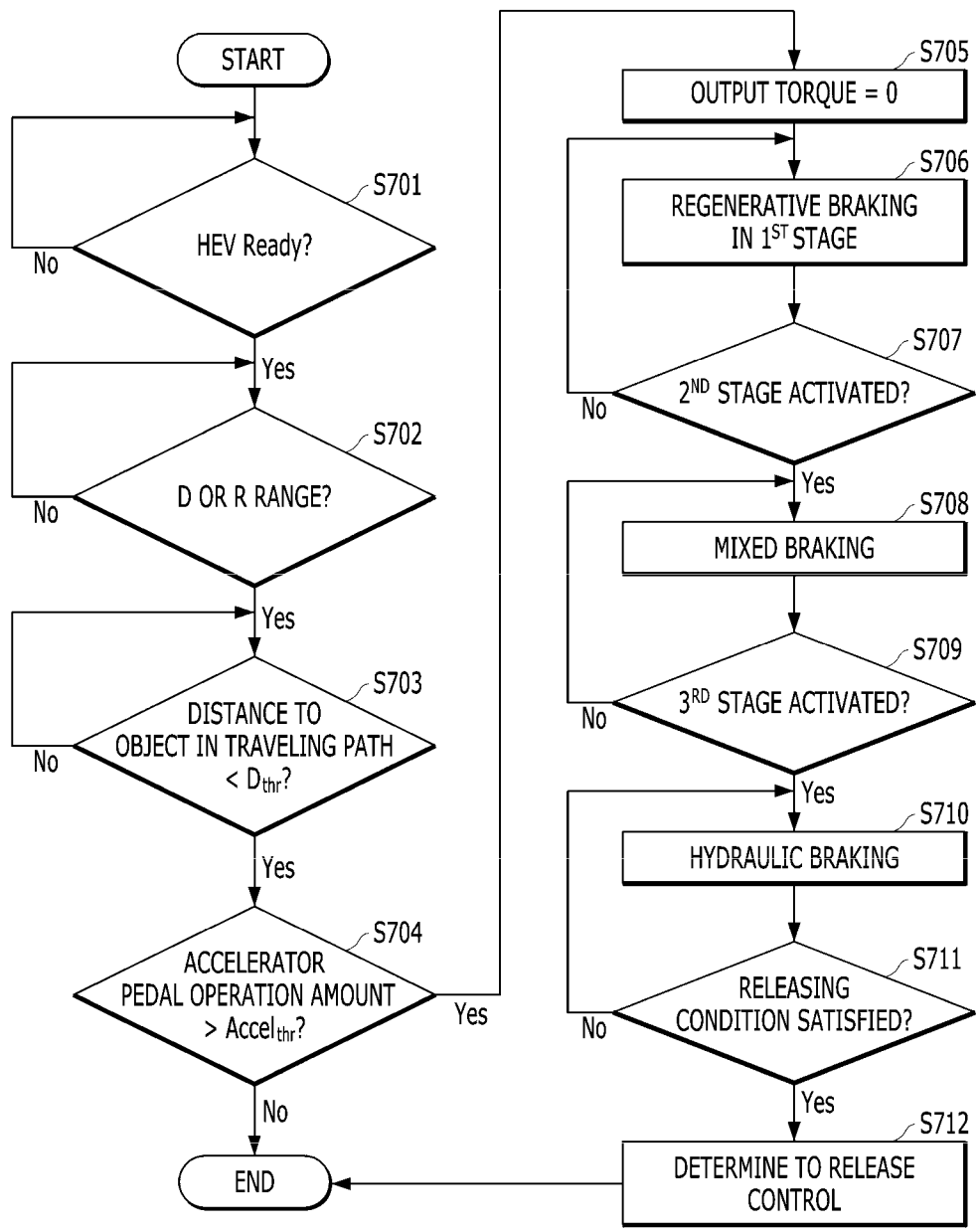
FIG. 7 is a flowchart showing an example of a collision prevention control process according to an embodiment of the present disclosure.

FIG. 7 is a flowchart showing an example of the collision prevention control process according to an embodiment of the present disclosure.

Referring to FIG. 7, the erroneous operation determination unit 311 may determine to begin collision prevention control according to the embodiment when the current state of the vehicle is "HEV Ready" (Yes in S701), a certain gear stage (i.e. the D range or the R range) is locked so that the vehicle travels in one direction (Yes in S702), the distance to an object present in the traveling path of the vehicle is less than the threshold distance $D_{thr}$ (Yes in S703), and the driver operates the accelerator pedal beyond the threshold operation amount $Accel_{thr}$ (Yes in S704).

The controller 320 activates the collision prevention control in response to the control entry instruction from the erroneous operation determination unit 311.

To this end, the controller 320 may first reduce the output torque of the driving source (e.g. set the output torque to 0).

In addition, the controller 320 may determine the time interval for each stage, and may perform control such that regenerative braking is performed during the time interval corresponding to the first stage (i.e. from a control starting point to T1) (S706).

Subsequently, when time passes and the second stage is activated (Yes in S707), the controller 320 may perform control such that mixed braking is performed during the time interval corresponding to the second stage (S708).

Subsequently, when time passes and the third stage is activated (Yes in S709), the controller 320 may perform control such that hydraulic braking is performed during the time interval corresponding to the third stage (S710).

After the collision prevention control is activated, the control release unit 313 may determine whether a preset control release condition is satisfied (S711), for example, when the driver shifts to the N range or the P range or operates the brake pedal, or when the vehicle is stopped. Upon determining that the control release condition is satisfied, the control release unit 313 may determine to terminate control (S712), and may transmit a control release instruction to the controller 320. Although it is illustrated in FIG. 7 that the determination on whether or not the control release condition is satisfied is made after the operation of hydraulic braking in the third stage, the determination on whether or not the control release condition is satisfied may be continuously made starting at the time of activation of the collision prevention control.

In response to the control release instruction, the controller 320 may release the collision prevention control. When the collision prevention control is released, the hybrid control unit 240 may control the powertrain according to a default setting. Here, the default setting may be a setting based on which the powertrain is controlled according to the state of the battery, the APS value, the BPS value, etc. in a general travel situation.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), a Read-Only Memory (ROM), a Random Access Memory (RAM), a Compact Disk ROM (CD-ROM), a magnetic tape, a floppy disc, and an optical data storage.

As is apparent from the above description, an electrified vehicle according to at least one embodiment of the present disclosure configured as described above is capable of more effectively achieving collision prevention control.

In particular, it is possible to control switching between brake sources in multiple stages depending on the distance to an obstacle in consideration of the characteristics of the brake system of the electrified vehicle in the situation in which the accelerator pedal is erroneously operated, thereby effectively achieving collision prevention control.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A method of controlling an electrified vehicle to prevent a collision thereof, the method comprising:
    determining whether an accelerator pedal is erroneously operated in a situation in which an obstacle is detected to be present in a traveling path; and
    upon determining that the accelerator pedal is erroneously operated, performing braking control such that at least one of hydraulic braking or regenerative braking is selectively performed in a plurality of braking sections determined based on a current vehicle speed and a distance to the obstacle.

2. The method according to claim 1, wherein the plurality of braking sections comprises:
    a first section in which the regenerative braking is performed;
    a second section in which both the regenerative braking and the hydraulic braking are performed; and
    a third section in which the hydraulic braking is performed.

3. The method according to claim 2, wherein the performing braking control comprises, in the second section as time passes, increasing a first braking amount generated by the hydraulic braking and decreasing a second braking amount generated by the regenerative braking.

4. The method according to claim 1, wherein each of the plurality of braking sections is set by equally dividing a time period from a time at which the braking control is started to a time at which a last section, among the plurality of braking sections, is terminated.

5. The method according to claim 4, wherein the time at which the last section is terminated corresponds to a time at which a vehicle reaches the obstacle at the current vehicle speed.

6. The method according to claim 1, wherein the determining whether the accelerator pedal is erroneously operated is performed to determine that the accelerator pedal is erroneously operated when the accelerator pedal is operated beyond a threshold operation amount in a situation in which the electrified vehicle is ready for travel, in which a gear stage corresponds to a drive range or a reverse range, and in which a distance to the obstacle is less than a threshold distance.

7. The method according to claim 6, wherein the threshold distance is set based on acceleration calculated using the current vehicle speed and the threshold operation amount.

8. The method according to claim 1, further comprising releasing the braking control when a gear stage is shifted to a neutral range or a parking range, when a brake pedal is operated, or when a vehicle is stopped.

9. The method according to claim 1, further comprising, when it is determined that the accelerator pedal is erroneously operated, setting an output torque of a driving source to 0.

10. A non-transitory computer-readable recoding medium containing a program configured to perform a method of controlling an electrified vehicle to prevent a collision of the electrified vehicle, wherein the method comprises:
    determining whether an accelerator pedal is erroneously operated in a situation in which an obstacle is detected to be present in a traveling path, and
    upon determining that the accelerator pedal is erroneously operated, performing braking control such that at least one of hydraulic braking or regenerative braking is selectively performed in a plurality of braking sections determined based on a current vehicle speed and a distance to the obstacle.

11. A device for controlling an electrified vehicle to prevent a collision thereof, the device comprising a controller configured to:
    determine whether an accelerator pedal is erroneously operated in a situation in which an obstacle is detected to be present in a traveling path, and
    upon determining erroneous operation of the accelerator pedal, perform braking control such that at least one of hydraulic braking or regenerative braking is selectively performed in a plurality of braking sections determined based on a current vehicle speed and a distance to the obstacle.

12. The device according to claim 11, wherein the plurality of braking sections comprises:
   a first section in which the regenerative braking is performed;
   a second section in which both the regenerative braking and the hydraulic braking are performed; and
   a third section in which the hydraulic braking is performed.

13. The device according to claim 12, wherein the controller, in the second section as time passes, increases a first braking amount generated by the hydraulic braking and decreases a second braking amount generated by the regenerative braking.

14. The device according to claim 11, wherein each of the plurality of braking sections is set by equally dividing a time period from a time at which the braking control is started to a time at which a last section, among the plurality of braking sections, is terminated.

15. The device according to claim 14, wherein the time at which the last section is terminated corresponds to a time at which a vehicle reaches the obstacle at the current vehicle speed.

16. The device according to claim 11, wherein the determination unit determines that the accelerator pedal is erroneously operated when the accelerator pedal is operated beyond a threshold operation amount in a situation in which the electrified vehicle is ready for travel, in which a gear stage corresponds to a drive range or a reverse range, and in which a distance to the obstacle is less than a threshold distance.

17. The device according to claim 16, wherein the threshold distance is set based on acceleration calculated using the current vehicle speed and the threshold operation amount.

18. The device according to claim 11, wherein the determination unit instructs the controller to release the braking control when a gear stage is shifted to a neutral range or a parking range, when a brake pedal is operated, or when a vehicle is stopped.

19. The device according to claim 11, wherein, when it is determined that the accelerator pedal is erroneously operated, the controller sets an output torque of a driving source to 0.

* * * * *